(12) United States Patent
Kouris et al.

(10) Patent No.: US 11,518,946 B2
(45) Date of Patent: Dec. 6, 2022

(54) FLUID CATALYTIC CRACKING PROCESS OF CRUDE LIGNIN OIL (CLO)

(71) Applicant: VERTORO B.V., Geleen (NL)

(72) Inventors: Panagiotis Kouris, Geleen (NL); Michael Dirk Boot, Geleen (NL); Emiel Jan Maria Hensen, Geleen (NL)

(73) Assignee: VERTORO B.V., Geleen (NL)

( * ) Notice: Subject to any disclaimer, the term of this patent is extended or adjusted under 35 U.S.C. 154(b) by 0 days.

(21) Appl. No.: 17/613,219

(22) PCT Filed: May 20, 2020

(86) PCT No.: PCT/EP2020/064102
§ 371 (c)(1),
(2) Date: Nov. 22, 2021

(87) PCT Pub. No.: WO2020/234369
PCT Pub. Date: Nov. 26, 2020

(65) Prior Publication Data
US 2022/0213389 A1   Jul. 7, 2022

(30) Foreign Application Priority Data
May 23, 2019   (EP) .................... 19176276

(51) Int. Cl.
*C10G 3/00* (2006.01)
*C10G 1/04* (2006.01)

(52) U.S. Cl.
CPC .............. *C10G 3/57* (2013.01); *C10G 1/04* (2013.01); *C10G 2300/1014* (2013.01);
(Continued)

(58) Field of Classification Search
None
See application file for complete search history.

(56) References Cited

U.S. PATENT DOCUMENTS

| 4,062,905 A | 12/1977 | Chang et al. |
| 2012/0005949 A1 | 1/2012 | Stevens et al. |

(Continued)

FOREIGN PATENT DOCUMENTS

| WO | 2011028776 A1 | 3/2011 |
| WO | 2012091815 A1 | 7/2012 |

(Continued)

OTHER PUBLICATIONS

Bare, S., Methanol to Olefins (MTO): Development of a Commercial Catalytic Process, FHI Lecture, Nov. 30, 2007, pp. 1-98, UOP LLC.

(Continued)

*Primary Examiner* — Philip Y Louie
(74) *Attorney, Agent, or Firm* — Hudak, Shunk & Farine Co. LPA

(57) ABSTRACT

A FCC process including the steps of
(a) adding a crude lignin oil (CLO) to a FCC unit, wherein the FCC unit has a FCC riser, a catalyst regenerator and a reactor/stripper, wherein CLO is a crude lignin oil composition including lignin and a polar organic solvent in 1:10 to 1:0.3 w/v ratio,
(b) optionally adding a second feed including a conventional FCC feedstock to the FCC unit,
(c) adding a regenerated catalyst from the regenerator to the FCC riser for catalytic cracking and upgrading the CLO and second feedstock to produce upgraded products and deactivated catalyst,
(d) adding the upgraded products and deactivated catalyst from the FCC riser to the reactor/stripper and separating upgraded products from deactivated catalyst in the reactor/stripper, (Continued)

(e) adding the deactivated catalyst from (d) to the regenerator to regenerate the deactivated catalyst to provide regenerated catalyst; and collecting the upgraded products.

18 Claims, 1 Drawing Sheet

(52) U.S. Cl.
CPC .............. *C10G 2300/302* (2013.01); *C10G 2300/4006* (2013.01); *C10G 2300/4012* (2013.01); *C10G 2300/4093* (2013.01); *C10G 2300/44* (2013.01); *C10G 2300/701* (2013.01); *C10G 2300/708* (2013.01)

(56) References Cited

U.S. PATENT DOCUMENTS

| 2012/0160741 A1 | 6/2012 | Gong et al. |
| 2013/0118059 A1 | 5/2013 | Lange et al. |
| 2014/0316176 A1 | 10/2014 | Fjare et al. |

FOREIGN PATENT DOCUMENTS

| WO | WO-2016204682 A1 * | 12/2016 | ............. C04B 24/24 |
| WO | 2017095316 A1 | 6/2017 | |
| WO | 2018147281 A1 | 8/2018 | |
| WO | 2019053287 A1 | 3/2019 | |

OTHER PUBLICATIONS

Pan, S., et al., Feeding Methanol in an FCC Unit, Petroleum Science and Technology, Jan. 23, 2008, pp. 170-180, vol. 26, Taylor & Francis Group, LLC.

Ma, Z., et al., Controlling the selectivity to chemicals from lignin via catalytic fast pyrolysis, Applied Catalysis A: General, 2012, pp. 130-136, vols. 423-424, Elsevier B.V.

Zhang, Y., et al., Techno-economic analysis of two bio-oil upgrading pathways, Chemical Engineering Journal, 2013, pp. 895-904, vol. 225, Elsevier B.V.

Rezaei, P., et al., Production of green aromatics and olefins by catalytic cracking of oxygenate compounds derived from biomass pyrolysis: a review, Applied Catalysis A: General, 2014, pp. 490-511, vol. 469.

Vogt, E., et al., Fluid catalytic cracking: recent developments on the grand old lady of zeolite catalysis, Chem. Soc. Rev., Sep. 18, 2015, pp. 7342 7370, vol. 44, Royal Society of Chemistry.

Pinho, A., et al., Co-processing raw bio-oil and gasoil in an FCC Unit, Fuel Processing Technology, 2015, pp. 159-166, vol. 131, Elsevier B.V.

Pinho, A., et al., Fast pyrolysis oil from pinewood chips co-processing with vacuum gas oil in an FCC unit for second generation fuel production, Fuel, Oct. 15, 2016, pp. 462-473, vol. 188, Elsevier Ltd.

* cited by examiner

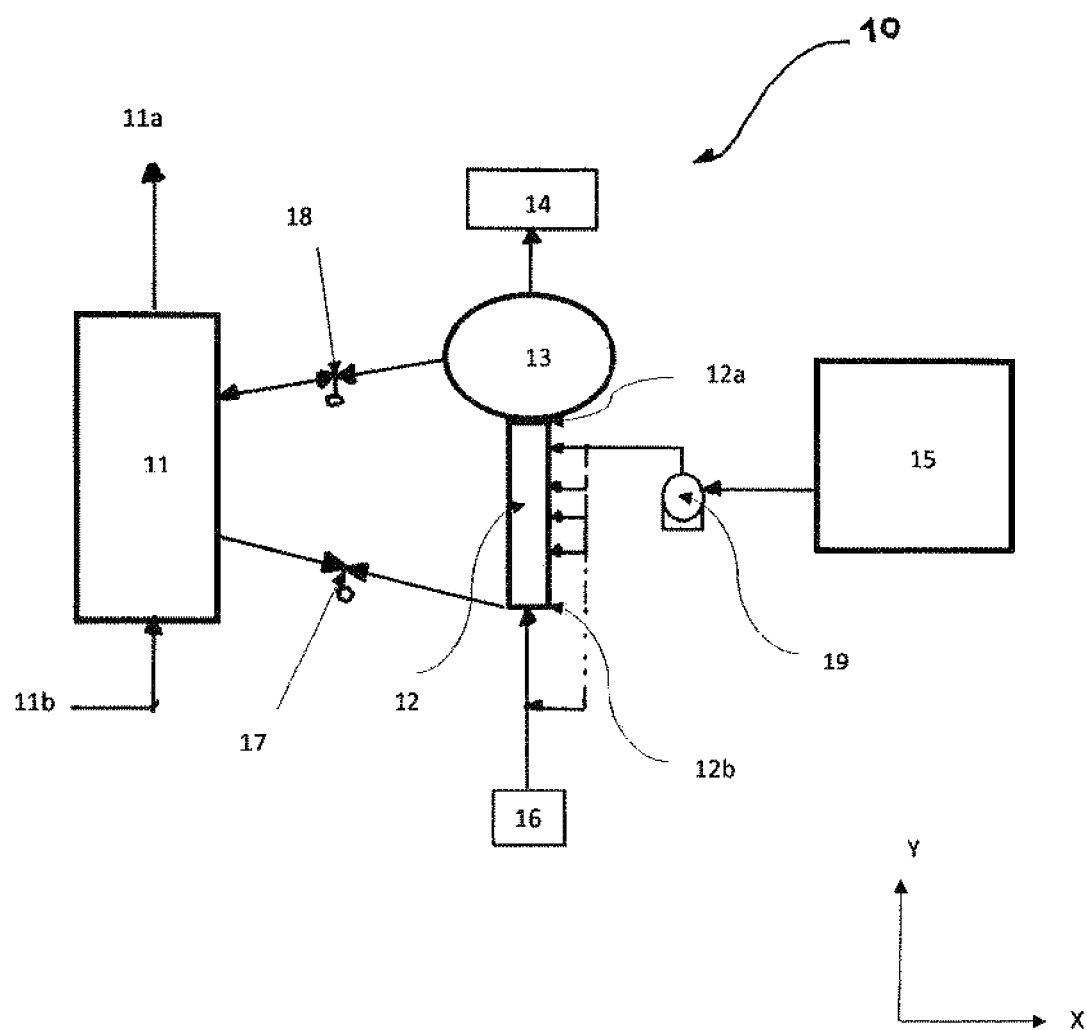

FLUID CATALYTIC CRACKING PROCESS OF CRUDE LIGNIN OIL (CLO)

FIELD OF THE INVENTION

This invention relates to a process for the upgrading of crude lignin oil (CLO) with a fluid catalytic cracking unit.

BACKGROUND OF THE INVENTION

Climate change and the associated need to reduce emissions of greenhouse gases mean that the chemical industry will have to rethink how to produce their products from renewable sources.

There are arguable two main types of platform chemicals: olefins and aromatics.

FCC is at the heart of many crude oil refineries for converting low-value heavy feeds into gasoline and middle distillate streams as well as light olefins. FCC units are comprised of separate reactor and regeneration zones between which the catalysts is moved, regenerated and reused. FCC feedstock such as vacuum gas oil (VGO) is usually a crude oil fraction with an initial boiling point higher than 340° C. and an average molecular weight ranging from 200-600 g/mol or higher. Hot catalyst material (i.e. zeolites) is combined with pre-heated feedstock at the bottom of the riser reactor. The reactant mixture expands and cools due to the endothermic cracking reaction as gases are formed, and the catalyst/feedstock mixture is rapidly transported up the riser reactor. The catalyst is separated from the product mixture and stripped of remaining useful product by steam treatment. The hydrocarbon products are further refined downstream. The catalyst material on which a coke is deposited during the cracking process is transported to the regenerator. The inevitable coking issue that deactivates the zeolite is turned into an advantage as coke is burned and heat is transferred to the reactor zone through the reheated catalyst material.

Olefins are traditionally produced from petroleum feedstocks by catalytic or steam cracking processes. These cracking processes, especially steam cracking, produce light olefin(s), such as ethylene and/or propylene, from a variety of hydrocarbon feedstocks. Ethylene and propylene are important commodity petrochemicals useful in a variety of processes for making plastics and other chemical compounds. With the increasing cost of petroleum crudes, oxygenates, especially alcohols, have entered into use for conversion into various hydrocarbon chemicals including light olefins such as ethylene and propylene, gasoline and distillate boiling range hydrocarbons. The methanol-to-olefins (MTO) process is an alternative approach to obtain these light olefins from methanol, which can be derived from other raw materials, including natural gas, coal, or even biomass (syngas). The conventional MTO process was developed by Mobil Oil in 1977 as it is described in the U.S. Pat. No. 4,062,905. Other Oil companies including UOP and Total have also been active in this area: a useful summary of methanol conversion technologies is given in Methanol to Olefins (MTO): Development of a Commercial Catalytic Process, Simon R. Bare, Advanced Characterization, UOP LLC, Modern Methods in Heterogeneous Catalysis Research, FHI Lecture 30 Nov. 2007. More specifically in the MTO process, methanol is first dehydrated to dimethyl ether (DME) to control the exotherm in the second step, followed by reaction of the equilibrated mixture to light olefins. Current commercial implementations of the original MTO process share similarities with the FCC process in the use of a combination of reactor and regeneration zones including a zeolite catalyst, in order to burn off the coke that is formed during the first reaction step.

The article "Feeding Methanol in an FCC unit, Pan et al., 2008; Petroleum Science and Technology, 26:170-180" relates to the feasibility analysis of integrating methanol to olefins (MTO) with fluidized catalytic cracking (FCC) process. The feasibility analysis of integrating MTO with FCC is based on their similarities and compatibility. The similarities of the two processes include the reaction conditions of high temperature, low pressure, high-space velocity, as well as the medium acid strength and hydrothermal stability of the catalyst. But the main difference is their catalyst's structure. The MTO catalysts are mainly small-pore or medium-pore zeolites, while the FCC catalysts are mainly Y-type zeolites, which are large-pore zeolites. Feeding methanol in FCC was found to produce more olefins. It was concluded that the higher hydrocarbon yield and selectivity to olefins were obtained with feeding the methanol solution at high temperatures (550° C.-600° C.), and the coke content was disadvantageous to the methanol conversion to light olefins. The proper position for the methanol conversion to olefins was the bottom of the riser as its temperature is higher and the catalyst has no coke deposits.

Biomass feedstock is used in applications like the production of paper and in cellulosic ethanol production. The lignocellulose matrix of the biomass feedstock is usually separated into hemicellulose and lignin. The former compound can be valorised to paper or ethanol, while the lignin is discarded.

Lignin, which comprises up to 30 wt. % of the plant biomass is the largest source of bio aromatics in nature and is more difficult to break down into high-value chemicals and fuels than glucose or (hemi-) cellulose. Moreover, most of the biorefinery layouts are based on biochemical upgrading of the glucose part of biomass and consider lignin as a waste stream.

In second generation bioethanol plants an approach is to use the heterogeneous nature of the lignin polymer in reductive depolymerisation techniques as a path towards fuels. This involves expensive catalysts, hydrogen for sufficient deoxygenation and harsh process conditions for effective cracking of lignin. In these conditions, secondary reactions can take place and are associated with high solvent consumption which leads to this approach being non-economical.

FCC units can in principle also be used to convert a biomass source like wood or lignin feedstocks.

A technical challenge lies in the solid nature of the feedstock and the different H/C/O ratios compared to fossil feeds.

High selectivity to aromatic hydrocarbons (BTX), suitable as transportation fuels or commodity chemicals, has already been demonstrated in catalytic fast pyrolysis (400-700° C.) of biomass.

Pyrolysis, which is the thermal decomposition of a substance into its elemental components and/or smaller molecules, is used in various methods developed for producing hydrocarbons, including but not limited to hydrocarbon fuels, from biomass. Pyrolysis requires moderate temperatures, generally greater than about 325° C., such that the feed material is sufficiently decomposed to produce products which may be used as hydrocarbon building blocks. Generally, the pyrolysis of biomass produces four primary products, namely water, "bio-oil," also known as "pyrolysis oil," char, and various gases (H2, CO, CO2, CH4, and other light hydrocarbons) that do not condense, except under extreme conditions.

Fast pyrolysis is one method for the conversion of biomass to bio-oil. Fast pyrolysis is the rapid thermal decomposition of organic compounds in the absence of atmospheric or added oxygen to produce liquids, char, and gas. Generally, fast pyrolysis uses dry (<10% moisture) feedstock of biomass ground down into small particles (between approximately 0.1-3 mm), moderate temperatures (325-750° C.), and short residence times (0.5-2 seconds). This pyrolysis reaction may be followed by rapid quenching to avoid further decomposition of the pyrolysis products and secondary reactions amongst the pyrolysis products. Fast pyrolysis affords operation at atmospheric pressure, moderate temperatures, and with low or no water usage. Bio-oil yields typically range from 50-75% mass of input biomass and are heavily feedstock dependent. Generally, known methods of bio-oil production result in bio-oil with high oxygen and water content; such oxygen and water content may result in storage instability and phase-separation issues.

For example, the pyrolysis of a wood-based biomass will produce a mixture of organic compounds such as lignin fragments, aldehydes, carboxylic acids, phenols, furfurals, alcohols, and ketones, as well as water. Unfortunately, compounds such as the aldehydes and acids may react with other components of the bio-oil, creating instability, corrosiveness, and poor combustion characteristics.

Co-processing biomass pyrolysis oils in FCC units with vacuum gasoil (VGO) has been demonstrated at the laboratory and pilot scale. Upgrading pyrolysis oils might seem practically possible but it is techno-economically challenging, due to acidity and the high oxygen content of the pyrolysis oil, contamination with other compounds, and the tendency to form coke by-products. Damaging costly cracking catalysts is expensive and removes any profit margins from processing biomass and pyrolysis oils to high value hydrocarbons. Furthermore, challenges in this context relate to the low miscibility of bio-oils with hydrocarbons, poor chemical stability and a too high rate of coke formation (leading to an improper plant heat balance) should be mentioned. Segregation or injection of both feeds at different heights and a hydrotreating step to stabilize the bio-oil prior to FCC cracking, can provide a way to overcome such problems. However, a hydrotreating step upfront could lead to a non-competitive process. To decrease the rate of coke formation, which is essentially due H/C/O ratio, one can consider to co-feed hydrogen or hydrogen donors. Of the latter, the beneficial effect of methanol in the feed on thermal and catalytic coke content of the zeolite catalyst is an example. A significant (50-60 wt.-%) reduction in total coke reduction content was reported when 80 wt. % of methanol was introduced into pyrolysis oils.

The international patent application WO2012/091815 discloses an integrated FCC biomass pyrolysis/upgrading process. The process uses a conventional FCC feed and a mixture of a solvent and biomass to produce upgraded fuel products. A slurry stream composed of solid biomass particles and a solvent is fed into an FCC riser through a slurry pump to achieve biomass pyrolysis and in situ pyrolysis oil upgrading. The catalytic cracking of the conventional petroleum feed also occurs in the riser reactor.

The current inventors have filed an international application with number WO2019/053287A1 with an invention that is related to a process for the production of a crude lignin oil (CLO), said process comprises the steps of providing a lignin-rich solid feedstock and subjecting the lignin-rich feedstock to a treatment in a polar organic solvent in the absence of an effective amount of added promoter, such as a catalyst and/or hydrogen, under operating conditions of an operating temperature up to 210° C., operating pressure lower than 50 bar, residence time up to 240 minutes, wherein the feeding ratio (w/w) of lignin to polar organic solvent ranges between 1:1.5 and 1:5. The main objective of this invention was to provide an economically feasible way to send lignin offsite the bio-refineries, remove not only the logistical inconvenience that caused by transportation of solid lignin but also the technical challenges of processing solids and thus create a potential feedstock platform bio-oil for the fuel market or the chemical sector.

SUMMARY OF THE INVENTION

The inventive step presented in this application relates to the use of CLO as a feed for the FCC process, either directly as a pure feed in the future when the share of oil has diminished or as a co-feed at the short term. There are several benefits. The CLO feed is a pumpable liquid that can be easily processed in a refinery. Especially, in the case where methanol is being used a polar organic solvent, with methanolic CLO as the main product, which is a liquid composition of methanol and lignin oligomers, can be a good feedstock for a FCC unit. Conventionally, FCC with lignin leads to too much coke. The advantage of co-feeding an amount of methanol is that it effectively increases the H/C ratio of the feed mixture. This will decrease the coking rate, potentially improving the plant heat balance. Chemically, one expects that methanol will be involved in catalytic conversion via different routes. First of all, methanol can be converted to light olefins that have intrinsic value, but these olefins can also be involved in further hydrocarbon conversion reactions that lead to reduced coking of the aromatic parts of the feed, e.g. through alkylation. A second aspect is that methanol is a strong alkylating agent that can react with aromatics, preventing fusing of mono-aromatics to multi-ring aromatics (coke precursors) and other hydrocarbons, thereby effectively increasing the H/C ratio of the products. A third route might be decomposition of methanol producing hydrogen that can also act as a co-reactant. At the same time, dealkylation of propyl sidechains, a prominent motive in lignin monomers, provides a source of additional propylene. The first two chemical routes can likely be controlled by the type of zeolite catalyst. For instance, addition of 10-membered ring zeolites to primarily conventional 12-membered ring large-pore (faujasite) zeolites for oligomer cracking, can help alkylation reactions to protect valuable monoaromatics and at the same time produce additional light olefins. In essence, the envision process provides an opportunity to convert lignin into mono-aromatics and at the same time upgrade the methanol in part to aromatics and in part to valuable light olefins. The product composition can be tuned by optimizing the amount of methanol, the catalyst mixtures used, and the reaction temperature, provided that a proper coking rate can be established.

REFERENCES

E. T. C. Vogt and B. M. Weckhuysen, Chemical Society Reviews 44, 7342 (2015).

Z. Ma, E. Troussard, and J. A. Van Bokhoven, Applied Catalysis A: General 423-424, 130 (2012).

C. M. Kinchin, L. C. Casavechia, A. de R. Pinho, H. L. Chum, M. S. Talmadge, M. B. B. de Almeida, and F. L. Mendes, Fuel 188, 462 (2016).

A. D. R. Pinho, M. B. B. De Almeida, F. L. Mendes, V. L. Ximenes, and L. C. Casavechia, Fuel Processing Technology 131, 159 (2015).

Y. Zhang, T. R. Brown, G. Hu, and R. C. Brown, Chemical Engineering Journal 225, 895 (2013).

P. S. Rezaei, H. Shafaghat, and W. M. A. W. Daud, Applied Catalysis A: General 469, 490 (2014).

DISCLOSURE OF THE INVENTION

The present invention relates to a FCC process comprising the steps of
- (a) adding a crude lignin oil (CLO) to a FCC unit, wherein the FCC unit comprises a FCC riser, a catalyst regenerator and a reactor/stripper,
- (b) adding a second feed comprising a conventional FCC feedstock to the FCC unit,
- (c) adding a regenerated catalyst from the regenerator to the FCC riser for catalytic cracking and upgrading the CLO and second feedstock to produce upgraded products and deactivated catalyst,
- (d) adding the upgraded products and deactivated catalyst from the FCC riser to the reactor/stripper and separating upgraded products from deactivated catalyst in the reactor/stripper,
- (e) adding the deactivated catalyst from (d) to the regenerator to regenerate the deactivated catalyst to provide regenerated catalyst; and (f) collecting the upgraded products.

Benefits of the Invention

The present invention has a number of benefits and surprising effects.

Processing a crude lignin oil that contains only the lignin part of the lignocellulosic biomass compared to the pyrolysis oil has profound effect on the total oxygen content of the feed. Impurities like ash, and inorganics, that are present in wood, are not transferred in the oil phase when using CLO as feed to the FCC process: the total oxygen content of the FCC feed is decreased (compared to pure biomass or pyrolysis oils with around 45 wt % oxygen), due to using mainly the lignin part of the biomass and not the other impurities in the oil (cellulose, proteins, inorganics, ash etc).

CLO comprises smaller oligomers in lignin (a reduction in Mw (vs. the technical lignin feedstock) of about 50%), which should help to mitigate coking.

The CLO feedstock has a tuneable CHO ratio (by adjusting the methanol-lignin ratio), which can be used to improve the FCC process.

The bio-content of the CLO feedstock has relatively high calorific value (vs. wood or cellulose for example).

The CLO preferably contains methanol, which solvents can act as hydrogen donor in the feed. The alcohol part of the CLO can be converted to light olefins.

Co-feeding of a CLO as liquid lignin composition solves further problems. For example, no slurry pump is needed to provide CLO to the FCC unit. The CLO feed is a pumpable liquid that can be easily processed in a refinery.

Cofeeding of CLO to a FCC unit will decrease the coking rate, potentially improving the plant heat balance.

BRIEF DESCRIPTION OF THE DRAWINGS

The FIGURE describes the FCC unit according to the present invention.

DETAILED DESCRIPTION OF THE INVENTION

The invention relates to a FCC process according to the present invention comprises the steps of
- (a) adding a crude lignin oil (CLO) to a FCC unit, wherein the FCC unit comprises a FCC riser, a catalyst regenerator and a reactor/stripper,
- (b) optionally adding a second feed comprising a conventional FCC feedstock to the FCC unit,
- (c) adding a regenerated catalyst from the regenerator to the FCC riser for catalytic cracking and upgrading the CLO and second feedstock to produce upgraded products and deactivated catalyst,
- (d) adding the upgraded products and deactivated catalyst from the FCC riser to the reactor/stripper and separating upgraded products from deactivated catalyst in the reactor/stripper,
- (e) adding the deactivated catalyst from (d) to the regenerator to regenerate the deactivated catalyst to provide regenerated catalyst; and
- (f) collecting the upgraded products.

FCC Process

Fluid Catalytic Cracking or FCC process vaporizes and breaks long-chain, high-boiling hydrocarbon liquids into shorter molecules by contacting the feedstock, at high temperature and moderate pressure, with a fluidized powdered catalyst.

Long-chain carbon compounds comprise long-chain hydrocarbons typically found in a conventional petroleum-based FCC feed stream as well as hydrocarbons, lignins, carbohydrates, lipids, fats, cholesterols, polyols, and other complex molecules found in biological materials including those found in biomass, and other biologically derived feed streams.

The FCC process may be conducted at a temperature between 400-800° C., preferably 500-650° C. and 0.5-3 bar, preferably 1-2 bar; preferably step (c) is conducted at a temperature between 400-800° C., preferably 500-650° C. and 0.5-3 bar.

The FCC process may have the lignin monomers or oligomers from the CLO in contact with the catalyst between 1-60 seconds, preferably between 1-10 seconds, more preferably between 2-4 seconds. There may be multiple contact times if two or more injection sites are used along the FCC riser.

The FCC process may have the CLO injected at one or more locations from the bottom of the FCC riser, for example $3/4$, $2/3$, $1/2$, $1/3$, $1/4$ vertically along the FCC riser, or at the top of the FCC riser.

CLO is preferably added in step (a) with a pump. The FCC process may have the CLO preferably added to the FCC riser using an oil pump.

The FCC process may have the FCC riser fed with a conventional FCC feedstock and a CLO in a weight ratio of between 100:1 and 1:100 (FCC feedstock to CLO), preferably between 50:1 and 1:50, more preferably between 10:1 and 1:10.

The FCC process may have the CLO stream injected together with a second conventional FCC feedstock stream.

Also hydrogen can be added to the FCC process to influence the CHO ratio of the feed to the FCC riser.

CLO

The present invention applies a crude lignin oil (CLO).

CLO is a crude lignin oil composition composed of lignin and a polar organic solvent in 1:10 to 1:0.3 w/v ratio. Such ratio between the lignin and the polar organic solvent leads to an efficient FCC process.

CLO typically comprises 5-80 wt. % of lignin and 20-95 wt. % of polar organic solvent. The lignin in CLO generally has a weight average molecular weight (Mw) between 500 and 5000 Dalton, preferably CLO has a weight average molecular weight (Mw) in a range of 1000-2000 Dalton with a polydispersity index in a range of 2.1-3. The CLO preferably has a kinematic viscosity at a shear rate of 300 (1/s) @40° C. between 1.5 and 200 cST.

CLO may contain (methylated) C5 and/or C6 sugars.

The polar solvent can in principle be any solvent which can make a stable lignin composition with a (partially depolymerized) lignin. Preferably the polar organic solvent is a polar organic solvent having at least one oxygen group. The polar organic solvent having at least one oxygen group is preferably chosen from the group of alcohols, ketones and esters, and combinations thereof. Examples of suitable alcohols are aliphatic alcohols, aromatic alcohols (like phenols) and multifunctional alcohols, for example diols. The melting temperature of the solvent is preferably lower than 50° C. more preferably lower than 40° C.

The polar organic solvent having at least one oxygen group is preferably chosen from the group of methanol, ethanol, n-propanol, i-propanol, t-butanol, i-butanol, phenol, dials, like for example ethylene glycol, diethylene glycol, triethylene glycol, tetraethylene glycol, propylene glycol, dipropylene glycol, tripropylene glycol, 1,3-propanediol, butanediol, hexanediol, glycerol, methyl acetate, ethyl acetate, acetone and methyl ethyl ketone, and combinations thereof. Most preferably the polar organic solvent is chosen from ethanol, methanol, diol, phenol or mixtures of these.

The CLO can contain some water in addition to the polar organic solvent. Water can come from the lignin, or be dissolved in the polar solvent (for example as an azeotropic mixture with ethanol). Typically, the amount of water is less than 25 wt. %, preferably less than 15 wt %, more preferably less than 10 wt. % of the sum of the lignin-rich solid feedstock and polar organic solvent.

Preferably, the total amount of the lignin and the polar organic solvent with respect to the CLO is at least 75 wt. %, at least 85 wt. %, at least 90 wt. %, at least 95 wt. %, at least 98 wt. %, at least 99 wt. % or 100 wt. %.

Preferably, the total amount of the lignin, the polar organic solvent and water with respect to the CLO is at least 95 wt. %, at least 98 wt. %, at least 99 wt. % or 100 wt. %.

Preferably, the CLO is a crude lignin oil composition comprising lignin and a polar organic solvent in 1:10 to 1:0.3 w/v ratio, wherein the lignin is solubilized in the polar organic solvent.

CLO can be prepared in a solvolysis process comprising the steps of providing a lignin-rich solid feedstock and subjecting the lignin-rich solid feedstock to a treatment in a polar organic solvent in the absence of an effective amount of added reaction promoter, such as a heterogeneous and/or homogeneous catalyst and/or hydrogen, and providing a lignin composition, said treatment comprises a step of contacting said lignin-rich solid feedstock with a polar organic solvent under operating conditions of an operating temperature up to 210° C., an operating pressure lower than 50 bar and a residence time up to 240 minutes, wherein the feeding ratio (w/v) of lignin (present in the lignin-rich solid feedstock) to polar organic solvent ranges between 1:1.5 and 1:15.

In this solvolysis process a mild depolymerisation can take place, with a minimum amount of char formation and a high amount of lignin solubilized in the polar organic solvent.

In this solvolysis reaction lignin is solubilized by means of a polar hydrocarbon to form a stable crude lignin oil or CLO. CLO is thus essentially a blend of both products. By tuning the process conditions, the ratio between these CLO constituents can be controlled.

In the first stage of the solvolysis process, lignin-rich solid feedstock is dispersed in a polar organic solvent and subjected to a mild depolymerisation process to produce a crude liquid lignin oil (CLO). In order to transform initially the lignin-rich solid feedstock to lignin composition, for example for use as a liquid chemical intermediate, a simplified approach involves cleavage of the weak ether linkages and break down of lignin into lower molecular weight oligomers. Ether linkages are more readily to be cleaved due to the lower bond enthalpy compared to the C—C linkages. The cleavage of lignin inter linkages in subcritical polar organic solvent conditions is believed to be the cause for partial depolymerisation. The relative yield of the depolymerized lignin components (monomers or oligomers) can be controlled by selecting a suitable set of process conditions for this first step. The key parameters of this process are temperature, residence time, lignin to solvent ratio and pressure.

Preferably the operating temperature for the solvolysis process ranges between 100-210° C., preferably between 140-205° C., between 150 and 200° C., more preferably in a range of 160-199° C.

Preferably the operating pressure for the solvolysis process ranges between 2-50 bar, preferably in a range of 5-40 bar.

Preferably the residence time for the solvolysis process ranges between 10-120 minutes, preferably in a range of 20-90 minutes, more preferably between 21-40 minutes.

In a preferred embodiment of the solvolysis process, first a lignin suspension is prepared in a solvent chosen from ethanol, methanol or mixtures thereof, after which the solvent (ethanol and/or methanol) can be (at least partially) replaced by a different polar organic solvent having at least one oxygen group.

Surprisingly the ratio of lignin to organic solvent can be very high in the solvolysis process. This means that the amount of solvent used to dissolve the solid lignin can be low. Preferably the lignin-rich solid feedstock (mass):polar organic solvent (volume) ratio is between 1:2 and 1:10. This ratio refers to the starting mixing ratio of lignin with the polar organic solvent, before reaction (first stage). Preferably the ratio of lignin to polar organic solvent ranges between 1:2 and 1:5, especially in the case that the organic solvent is chosen from ethanol and/or methanol.

The present solvolysis process comprises thus a method for creating a reversible lignin composition (the crude liquid lignin oil, CLO) by means of mild solvolytic chemical modifications wherein lignin is solubilized in a polar organic solvent in specific ratio and can be transported in liquid form to the FCC riser.

In relation to the CLO composition (solvent to lignin) the term "ratio" is always based on a w/v ratio, i.e. weight per volume: it is expressed as the grams of lignin or lignin fragments which are dissolved in 1 ml solvent. The ratio is measured at 25° C. For example, a ratio of 1:2 means that 1 gram of lignin is dissolved in 2 ml of solvent.

It is advantageous to add CLO to the FCC riser, wherein the CLO is a medium crude lignin oil composition (CLO-M) composed of lignin and a polar organic solvent in 1:10 to 1:5 w/v ratio or wherein the CLO is a heavy crude lignin oil composition (CLO-H) composed of lignin and a polar organic solvent in 1:2 to 1:0.3 w/v ratio, after distillation of excess solvent.

In a preferred embodiment the reaction mixture, obtained after solvolyse of the lignin-rich solid feedstock, is subjected to a solid/liquid separation step for obtaining a liquid phase and a solid phase. The liquid phase is the CLO (lignin composition), while the solid phase is comprising undissolved products from the lignin-rich solid feedstock.

In an embodiment the solid/liquid separation step is chosen from the group of filtration, centrifugation, decanting, settling, membranes, flash evaporation, or a combination thereof.

In an embodiment the liquid phase is subject to a separation step for further removing said polar organic solvent, wherein the separation step is chosen from the group of vacuum distillation, atmospheric distillation, rotary evaporation and flash evaporation.

In an embodiment the step of removing the polar organic solvent is continued until the ratio between the reaction lignin product and said polar organic solvent is in a range 1:2 and 1:0.3 for obtaining a product identified as heavy crude lignin oil (CLO-H). This ratio refers to the actual final amount of reaction lignin product solubilized in the polar solvent after the separation step.

Examples of the lignin-rich solid feedstock are based on lignocellulosic biomass feedstock pre-treatment processes, such as acidic pulping, alkaline pulping (either Kraft or Soda), Bergius-Rheinau process, steam explosion, organosols pulping, (dilute) acid based hydrolysis, fraction processes based on Ionic Liquids (ILs), liquid salts (e.g., zinc chloride hydrate) or Deep eutectic solvents (DES), superheated or supercritical steam.

The CLO used in the present invention can be for example a medium CLO or a high CLO.

The medium crude lignin composition (CLO-M) typically comprises 8-30 wt. % of lignin and 70-92 wt. % of polar organic solvent, preferably between 10 and 30 wt. % lignin and 70-90 wt. % of polar organic solvent. The lignin in CLO-M preferably has a weight average molecular weight (Mw) in a range of 1000-2000 Dalton with a polydispersity index in a range of 2.1-3. The CLO-M lignin composition preferably has a kinematic viscosity at a shear rate of 300 (1/s) @40° C. between 1.5 and 20, preferably between 1.8 and 10 (cST).

The CLO-M can contain different polar solvents. Preferably the polar organic solvent of the CLO-M is selected from diols and phenols, more preferably from ethanol and methanol. Preferably the amount of water in the CLO-M is less than 10 wt. %, more preferably less than 5 wt. %, less than 2 wt. %, relative to the CLO-M composition.

The removing of solvent in the second stage continues to a lignin product in organic solvent which is still soluble, and no precipitation of the lignin occurs.

The lignin composition CLO-H typically comprises 30-80 wt. % of lignin and 20-70 wt. % organic solvent, preferably between 50 and 75 wt. % lignin and 25-50 wt. % organic solvent. The lignin in CLO-H preferably has a weight average molecular weight (Mw) in a range of 1000-2000 Dalton with a polydispersity index in a range of 2.1-3. The lignin composition preferably has a kinematic viscosity at a shear rate of 300 (1/s) @ 40° C. between 20 and 200 cST, preferably between 50 and 150 or between 60 and 140 (cST).

The CLO-H can contain different polar solvents. Preferably the polar organic solvent of the CLO-H is selected from ethanol, methanol, dials, and phenol. Most preferably the polar organic solvent of the CLO-H is chosen from ethanol and methanol. Preferably the amount of water in the CLO-H is less than 10 wt. %, preferably less than 5 wt. %, or less than 2 wt. %, relative to the CLO-H composition.

In an embodiment the oxygen to carbon ratio (O:C ratio) of the lignin in the CLO-M and CLO-H lignin compositions obtained according the present method as discussed above is in a range of 0,25-0,45.

Second Feed Stream

A conventional FCC feed may be used as a second feed stream and comprises a conventional petroleum FCC feed, vacuum gas oil (VGO), heavy vacuum gas oil (HVGO), heavy vacuum oil, atmospheric distillation bottoms, coker gas oil, hexanes, naphthas, light cycle oil, heavy cycle oil, fuel oil, decant oil, raffinate, cyclohexane, n-hexane, kerosene, diesel, water, steam, alcohols, polyols, and mixtures of these solvents.

The second feed stream comprises a conventional FCC feedstock, wherein said second stream may be injected into the FCC riser at the bottom or vertically along said FCC riser. The second feed stream may be injected at the same location as the CLO stream. The second feed stream may be injected at a different location from the CLO stream.

The conventional FCC feed to FCC may be the portion of the crude oil that has an initial boiling point of 340° C. or higher at atmospheric pressure and an average molecular weight ranging from about 200 to 600 or higher. This portion of crude oil may be heavy gas oil or vacuum gas oil (HVGO).

Catalyst

The catalyst may be a fluidized powdered catalyst. The catalyst may be an active amorphous clay-type catalyst and/or a high activity, crystalline zeolite. Zeolite catalysts have been surprisingly found to have selectivity to the desired products in the FCC unit.

The catalyst may comprise a large pore zeolite, such as a Y-type zeolite, an active alumina material, a binder material, comprising either silica or alumina or a clay such as kaolin.

The FCC process may have a regenerated catalyst comprise zeolites, preferably an aluminosilicate zeolite.

The catalyst may be a medium or smaller pore zeolite catalyst, such as for example ZSM-5, ZSM-11, ZSM-12, ZSM-23, ZSM-35, ZSM-38, ZSM-48, ferrierite, erionite, and ST-5, developed by Petroleos de Venezuela, S. A.

The catalyst preferably comprises a medium or smaller pore zeolite on a matrix comprising a binder material such as silica or alumina and an inert filer material such as kaolin. The catalyst may also comprise some other active material such as beta zeolite.

The cracking reactions of the FCC process may produce some carbonaceous material (referred to as catalyst coke) that deposits on the catalyst and very quickly reduces the catalyst reactivity, the catalyst is regenerated by burning off the deposited coke with air blown into the regenerator. The regenerator may operate at a temperature between 700-750° C. and a pressure between 2-3 bar.

FCC Unit

FCC units can include "stacked" and "side-by-side" reactors, as well as other configurations. In a stacked reactor, the reactor and the catalyst regenerator are comprised in a single vessel with the reactor above the catalyst regenerator. The side-by-side reactor has separate reactor and catalyst regenerator in two separate vessels, often side by side.

The Fluid Catalytic Cracking (FCC) 10 unit comprises at least one FCC riser 12 having a longitudinal axis Y, a catalyst regenerator 11, CLO stream unit 15 and a reactor/stripper 13. The FCC riser 12 may have a first end 12a and a second end 12b along the longitudinal axis Y. The FCC riser 12 may receive the CLO stream unit 15.

In the FCC riser 12, CLO reacts with regenerated catalyst 17 for catalytic cracking and upgrading producing upgraded products 14. CLO may be injected to the FCC riser 12 in a direction that is perpendicular with respect to the longitudinal axis Y of the FCC riser 15.

The FCC biomass unit may have the CLO injected at one or more locations along the longitudinal axis Y of the FCC riser 12, for example ¾, ⅔, ½, ⅓, ¼ along the longitudinal axis Y of the FCC riser 12.

The reactor/stripper 14 may be adapted for separating upgraded products from deactivated catalyst 18. The reactor/stripper 13 is preferably arranged the longitudinal axis Y of FCC riser 12, The reactor/stripper 13 may be connected to the FCC riser 12 at a first end 12a of said FCC riser 12.

If desired, the FCC riser 12 may receive a second conventional FCC feedstock 16. The second conventional FCC feedstock 16 may be associated with the second end 12b of FCC riser 12. Said conventional FCC feedstock 16 reacts with regenerated catalyst 17 for catalytic cracking and upgrading producing upgraded products 14.

In some embodiments, the catalyst regenerator 11 may regenerate the deactivated catalyst 18 to regenerated catalyst 17. Preferably said deactivated catalyst 18 may be transmitted to the regenerator 11 from said reactor/stripper 13 via a first motor valve and a regenerated catalyst 17 from the regenerator 11 may be transmitted to the FCC riser 12 via a second motor valve.

Further the FCC unit 10 preferably comprises a CLO stream unit 15 and preferably a pump 19 to transport the CLO stream to the FCC riser 12.

The FCC biomass unit preferably is dosed with a CLO stream comprising 5-80 wt. % of lignin, preferably between 50-75 wt. % lignin, and methanol; wherein the wt. % is relative to the total weight of the CLO stream.

The CLO stream may be transported to the FCC riser using any pump, for example an oil pump.

The FCC biomass unit may have the CLO stream injected together with the second conventional FCC feedstock stream.

The FCC biomass unit may have the regenerated catalyst comprising zeolites, preferably an aluminosilicate zeolite.

Lignin contact time with the catalyst may be between 1-60 seconds, for example between 1 and 30 seconds, preferably between 1 and 10 seconds, more preferably between 2-4 seconds, or there may be multiple contact times if two or more injection sites are used along the FCC riser.

Reactor/Stripper

The reactor/stripper for separating upgraded products from deactivated catalyst is connected to the FCC riser at the top end of said FCC riser. The reactor/stripper is further in connection with the regenerator.

The reactor/stripper may be a vessel in which the upgraded product vapours are: (a) separated from the deactivated catalyst by flowing through a set of two-stage cyclones within the reactor/stripper and (b) the deactivated catalyst flows downward through a steam stripping section to remove any hydrocarbon vapours before the deactivated catalyst returns to the regenerator Regenerator The regenerator is in connection with the reactor/stripper and with the FCC riser. The deactivated catalyst that is separated from the gaseous component in the reactor/stripper and is introduced into the regenerator from the reactor/stripper, and coke is removed from the deactivated catalyst in the regenerator. The regenerator passes regenerated catalyst to the FCC riser.

FCC Products

The upgraded products of the FCC process may comprise one or more products selected from the group of depolymerized lignin, (deoxygenated aromatics) benzene, toluene, xylene, (oxygenated aromatics), phenolics, alkylated phenolics, gasoline, light cycle oil, light gases, #8 fuel oil, decant oil, naphtha, raffinate, cyclohexane, n-hexane, kerosene, diesel, fuel oil, methane, ethane, ethylene, propane, propylene, mixed butanes, petroleum coke and combinations thereof.

Embodiment

The following examples of certain embodiments of the invention are given. Each example is provided by way of explanation of the invention, one of many embodiments of the invention, and the following examples should not be read to limit, or define, the scope of the invention.

In one embodiment, a CLO stream may be fed into a FCC riser through a pump to achieve lignin upgrading. The catalytic cracking of the conventional FCC feed also occurs in the FCC riser. The solid and vapor products are separated by cyclones in the FCC reactor. Solid products entrained by the catalyst particles are burned off in the regenerator and the vapor (conversion) product is distilled into various streams such as for example naphtha, CLO, and decant oil in the main fractionator.

In another embodiment, lignin may be cracked and upgraded to fuel products by transporting the CLO stream through a pump to a FCC riser; combining the CLO stream with a conventional FCC feed stream and regenerated catalyst in the FCC riser, cracking and upgrading the lignin to upgraded fuel products in the FCC riser; separating upgraded fuel products from deactivated catalyst in reactor/stripper, regenerating the deactivated catalyst in the regenerator; and recycling the regenerated catalyst to the FCC riser.

The invention also relates to a Fluid Catalytic Cracking (FCC) unit for upgrading of CLO as defined above.

| REFERENCE NUMERALS | |
|---|---|
| FCC Unit | 10 |
| Regenerator | 11 |
| Air | 11a |
| Flue Gas | 11b |
| FCC Riser | 12 |
| First End of FCC Riser | 12a |
| Second End of FCC Riser | 12b |
| Reactor/Stripper | 13 |
| Product | 14 |
| CLO Stream Unit | 15 |
| Conventional FCC Feedstock | 16 |
| Regenerated Catalyst | 17 |
| Deactivated Catalyst | 18 |
| Pump | 19 |
| Longitudinal central axis | Y |
| Perpendicular axis | X |

The invention claimed is:

1. A FCC process, comprising the steps of:
   (a) adding a crude lignin oil (CLO) to a FCC unit, wherein the FCC unit comprises a FCC riser, a catalyst regenerator and a reactor/stripper, wherein the CLO is a crude lignin oil composition comprising lignin and a polar organic solvent in 1:10 to 1:0.3 w/v ratio, wherein the lignin has a weight average molecular weight (Mw) in a range of 1000-2000 Dalton and the polar organic solvent comprises methanol, wherein the CLO is a medium crude lignin composition (CLO-M) comprising 8-30 wt. % of lignin and 70-92 wt. % of polar organic solvent or the CLO is a high crude lignin composition (CLO-H) comprising 30-80 wt. % of lignin and 20-70 wt. % polar organic solvent based on the total weight of the CLO and
   the oxygen to carbon ratio (O:C ratio) of the lignin in the CLO-M and CLO-H lignin composition is in a range of 0.25-0.45,
   (b) optionally adding a second feed comprising a FCC feedstock to the FCC unit,
   (c) adding a regenerated catalyst from the regenerator to the FCC riser for catalytic cracking and upgrading the CLO and second feedstock to produce upgraded products and deactivated catalyst,
   (d) adding the upgraded products and deactivated catalyst from the FCC riser to the reactor/stripper and separating upgraded products from deactivated catalyst in the reactor/stripper,
   (e) adding the deactivated catalyst from (d) to the regenerator to regenerate the deactivated catalyst to provide regenerated catalyst; and
   (f) collecting the upgraded products.

2. The FCC process according to claim 1, wherein the lignin is solubilized in the polar organic solvent.

3. The FCC process according to claim 1, wherein the catalytic cracking and upgrading process in the FCC riser is conducted at a temperature between 400-800° C., and a pressure between 0.5-3 bar, and/or the contact time between catalyst and CLO in the FCC riser ranges between 1-60 seconds.

4. The FCC process according to claim 1, wherein CLO comprises 50-75 wt. % of lignin and 25-50 wt. % of polar organic solvent.

5. The FCC process according to claim 1, wherein the lignin has a polydispersity index in a range of 2.1-3 and/or wherein the CLO has a kinematic viscosity at a shear rate of 300 (1/s) @40° C. between 1.5 and 200 cST.

6. The FCC process according to claim 1, wherein CLO is a medium crude lignin composition (CLO-M) comprising 8-30 wt. % of lignin and 70-92 wt. % of polar organic solvent, and wherein CLO-M lignin composition has a kinematic viscosity at a shear rate of 300 (1/s) @40° C. between 1.5 and 20 cST.

7. The FCC process according to claim 1, wherein CLO is a high crude CLO (CLO-H) comprising 30-80 wt. % of lignin and 20-70 wt. % polar organic solvent, and wherein the CLO-H has a kinematic viscosity at a shear rate of 300 (1/s) @40° C. between 20 and 200 cST.

8. The FCC process according to claim 1, wherein the CLO has been prepared in a solvolysis process comprising the steps of providing a lignin-rich solid feedstock and subjecting the lignin-rich solid feedstock to a treatment in a polar organic solvent in the absence of an effective amount of added reaction promoter, and providing a lignin composition, wherein said treatment comprises a step of contacting said lignin-rich solid feedstock with a polar organic solvent under operating conditions of an operating temperature up to 210° C., an operating pressure lower than 50 bar and a residence time up to 240 minutes, wherein the feeding ratio (w/v) of lignin (present in the lignin-rich solid feedstock) to polar organic solvent ranges between 1:1.5 and 1:15, wherein the reaction mixture, obtained after solvolyse of the lignin-rich solid feedstock, is subjected to a solid/liquid separation step for obtaining a liquid phase and a solid phase.

9. The FCC process according to claim 1, wherein the total amount of the lignin and the polar organic solvent with respect to the CLO is at least 75 wt. %, at least 85 wt. %, at least 90 wt. %, at least 95 wt. %, at least 98 wt. %, at least 99 wt. % or 100 wt. %.

10. The FCC process according to claim 1, wherein the CLO comprises methylated or non-methylated C5 and/or C6 sugars.

11. The FCC process according to claim 2, wherein the catalytic cracking and upgrading process in the FCC riser is conducted at a temperature between 400-800° C. and a pressure between 0.5-3 bar, and/or the contact time between catalyst and CLO in the FCC riser ranges between 1-60 seconds.

12. The FCC process according to claim 2, wherein CLO comprises 50-75 wt. % of lignin and 25-50 wt. % of polar organic solvent.

13. The FCC process according to claim 2, wherein the lignin has a polydispersity index in a range of 2.1-3 and/or wherein the CLO has a kinematic viscosity at a shear rate of 300 (1/s) @40° C. between 1.5 and 200 cST.

14. The FCC process according to claim 2, wherein CLO is a medium crude lignin composition (CLO-M) comprising 8-30 wt. % of lignin and 70-92 wt. % of polar organic solvent, and wherein CLO-M lignin composition has a kinematic viscosity at a shear rate of 300 (1/s) @40° C. between 1.5 and 20 cST.

15. The FCC process according to claim 2, wherein CLO is a high crude CLO (CLO-H) comprising 30-80 wt. % of lignin and 20-70 wt. % organic solvent, and wherein the CLO-H has a kinematic viscosity at a shear rate of 300 (1/s) @40° C. between 20 and 200 cST.

16. The FCC process according to claim 2, wherein the CLO has been prepared in a solvolysis process comprising the steps of providing a lignin-rich solid feedstock and subjecting the lignin-rich solid feedstock to a treatment in a polar organic solvent in the absence of an effective amount of added reaction promoter, and providing a lignin composition, wherein said treatment comprises a step of contacting said lignin-rich solid feedstock with a polar organic solvent under operating conditions of an operating temperature up to 210° C., an operating pressure lower than 50 bar and a residence time up to 240 minutes, wherein the feeding ratio (w/v) of lignin (present in the lignin-rich solid feedstock) to polar organic solvent ranges between 1:1.5 and 1:15, wherein the reaction mixture, obtained after solvolyse of the lignin-rich solid feedstock, is subjected to a solid/liquid separation step for obtaining a liquid phase and a solid phase.

17. The FCC process according to claim 2, wherein the total amount of the lignin and the polar organic solvent with respect to the CLO is at least 75 wt. %, at least 85 wt. %, at least 90 wt. %, at least 95 wt. %, at least 98 wt. %, at least 99 wt. % or 100 wt. %.

18. The FCC process according to claim 2, wherein the CLO comprises methylated or non-methylated C5 and/or C6 sugars.

* * * * *